(12) United States Patent
Staunton et al.

(10) Patent No.: US 9,333,875 B2
(45) Date of Patent: May 10, 2016

(54) SYSTEM AND METHOD FOR PROVIDING POWER TO A MOVING ELEMENT

(75) Inventors: Darragh Staunton, Kochel am See (DE); Albert Kleinikkink, Kitchener (CA); John Ditner, New Hamburg (CA); Scott Lindsay, New Hamburg (CA); Javan Taylor, Ayr (CA)

(73) Assignee: ATS AUTOMATION TOOLING SYSTEMS INC., Cambridge, Ontario (CA)

( * ) Notice: Subject to any disclaimer, the term of this patent is extended or adjusted under 35 U.S.C. 154(b) by 341 days.

(21) Appl. No.: 13/194,268

(22) Filed: Jul. 29, 2011

(65) Prior Publication Data

US 2012/0145500 A1 Jun. 14, 2012

Related U.S. Application Data

(60) Provisional application No. 61/368,875, filed on Jul. 29, 2010.

(51) Int. Cl.
*B60L 13/03* (2006.01)
*B60L 5/00* (2006.01)
*H02J 5/00* (2016.01)

(52) U.S. Cl.
CPC ............... *B60L 13/03* (2013.01); *B60L 5/005* (2013.01); *H02J 5/005* (2013.01)

(58) Field of Classification Search
CPC .............................. B60L 13/03; B60L 13/005
USPC ........... 191/10; 104/290, 292, 281, 282, 266, 104/294; 318/135, 599, 811, 461; 388/811, 388/599, 461, 800, 804, 805, 812, 814, 819, 388/820
See application file for complete search history.

(56) References Cited

U.S. PATENT DOCUMENTS 3,368,496 A * 2/1968 Falk et al. .................. 104/18
4,635,560 A * 1/1987 Ballantyne ................ 104/292
(Continued)

FOREIGN PATENT DOCUMENTS

| DE | 3237373 | 5/1983 |
| DE | 4126454 | 2/1993 |

(Continued)

OTHER PUBLICATIONS

PCT International Searching Authority (CA), International Search Report, Oct. 14, 2011, PCT/CA2011/050469.
(Continued)

*Primary Examiner* — Mark Le
*Assistant Examiner* — Jean Charleston
(74) *Attorney, Agent, or Firm* — Dowell & Dowell, P.C.

(57) ABSTRACT

A system and method for providing power to a plurality of moving elements in a transport system that include: tracking a position of each of the plurality of moving elements in the transport system; and selectively operating a power system provided to the transport system based on the position of each of the plurality of the moving element such that power is independently transferred to each of the plurality of moving elements. In another embodiment, the system and method include: adapting the plurality of moving elements to receive power from a drive component used to drive the plurality of moving elements along the transport system; and controlling the drive component to provide power to the plurality of moving elements, and, in particular, while the moving elements are moving.

11 Claims, 16 Drawing Sheets

(56) References Cited

U.S. PATENT DOCUMENTS

| | | | |
|---|---|---|---|
| 4,651,079 A * | 3/1987 | Wills | 318/811 |
| 4,841,869 A | 6/1989 | Takeuchi et al. | |
| 5,023,495 A | 6/1991 | Ohsaka et al. | |
| 5,033,391 A * | 7/1991 | Watanabe | 104/23.2 |
| 6,075,297 A * | 6/2000 | Izawa et al. | 310/12.21 |
| 6,089,512 A | 7/2000 | Ansorge et al. | |
| 6,191,507 B1 | 2/2001 | Peltier et al. | |
| 6,397,990 B1 * | 6/2002 | Brien et al. | 191/10 |
| RE39,747 E * | 7/2007 | Peltier et al. | 310/12.11 |
| 2004/0089956 A1 * | 5/2004 | Ramin | 257/787 |
| 2005/0127861 A1 * | 6/2005 | McMillan et al. | 318/268 |
| 2007/0289476 A1 | 12/2007 | Schemm et al. | |
| 2010/0276256 A1 * | 11/2010 | Kleinikkink et al. | 198/793 |
| 2011/0253495 A1 * | 10/2011 | Vollenwyder et al. | 191/10 |

FOREIGN PATENT DOCUMENTS

| | | |
|---|---|---|
| DE | 102008059194 | 6/2010 |
| GB | 2463693 | 3/2010 |
| WO | 9850760 | 12/1998 |
| WO | 0024017 | 4/2000 |
| WO | 0102211 | 1/2001 |

OTHER PUBLICATIONS

PCT International Searching Authority (CA), The Written Opinion of the International Search Report, Oct. 14, 2011, PCT/CA2011/050469.

European Patent Office, Extended European Search Report on European Appln. No. 11811709.2, dated Nov. 5, 2013.

European Patent Office, Examination Report on EP Appln. No. 11811709.2, dated Sep. 16, 2014.

European Patent Office, English translation of Abstract for German Patent No. 3237373.

European Patent Office, English translation of Abstract for German Patent No. 102008059194.

European Patent Office, English translation of Abstract for German Patent No. 4126454.

European Patent Office, Examination Report on EP Appln. No. 11811709.2, dated Jul. 3, 2015.

* cited by examiner

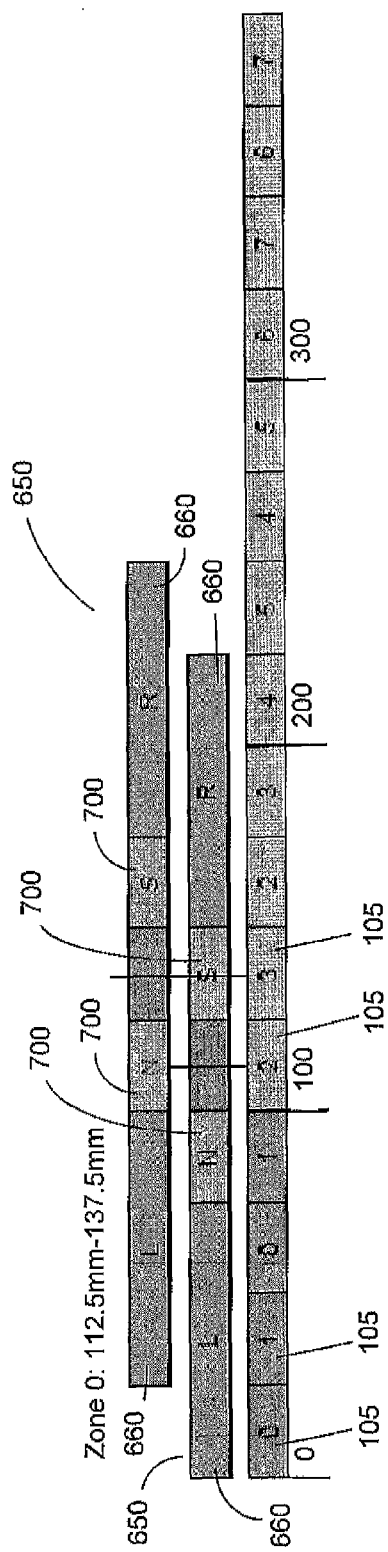
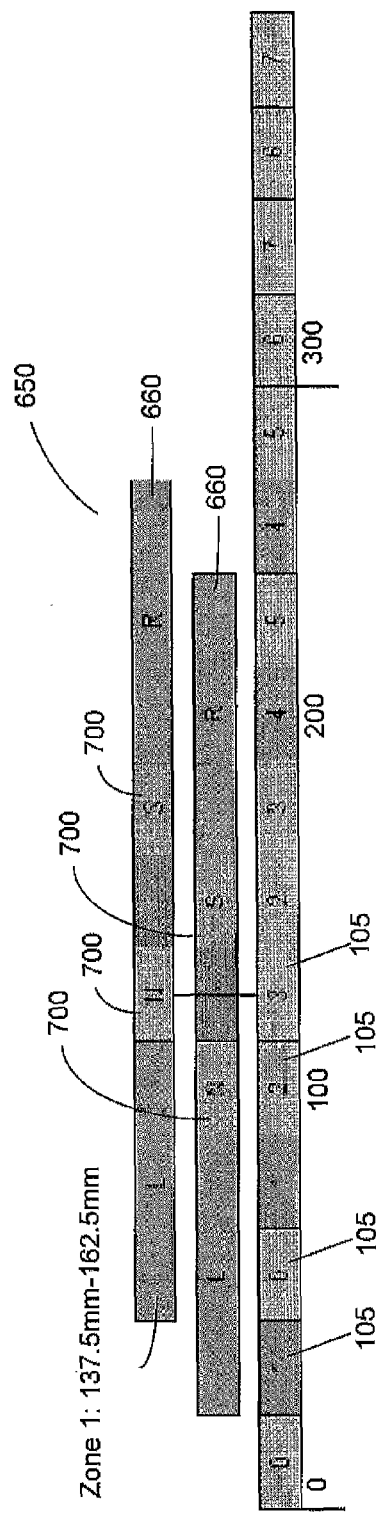
FIG. 13A
FIG. 13B

SYSTEM AND METHOD FOR PROVIDING POWER TO A MOVING ELEMENT

RELATED APPLICATIONS

This application claims priority to U.S. Provisional Patent Application No. 61/368,875 filed Jul. 29, 2010.

FIELD

This application generally relates to transport systems and methods, and more specifically to systems and methods for providing power to moving elements in a transport system.

BACKGROUND

One issue for transport systems, including belt or scroll driven conveyors as well as linear driven conveyors, is the provision of power to the moving element/pallet for use as a power source on the moving element/pallet, either while moving or stationary. Having a power source on the moving element/pallet can be used for many different during processing, testing or the like.

Power sources can be provided to a moving element/pallet by using batteries, however these can be bulky and require regular recharging. Power can also be provided by cabling but this requires guidance systems for the cabling during movement and can limit the range of motion.

Some attempts have been made to provide power on moving elements/pallets for transport systems using inductive power. Most conventional inductive power transfer systems use a high frequency alternate current primary conductor for providing an electromagnetic field extending along the primary conductor and a pick-up unit with a secondary conductor for the inductive energy transfer. The primary conductor is typically located parallel to the motion path so that the space between the primary and secondary conductor remains essentially constant. As such, typical existing inductive power transfer systems:

- radiate an electromagnetic field along the entire motion path irrespective of the location of any pick-up units;
- use a single fixed frequency power supply to energize the primary conductor;
- require intelligent pick-up units to provide on/off control and/or variable power output; and
- unintended coupling on an unexpected receiver could result in power leakage or damage, for example, to unshielded electronic equipment, or personal injury, for example jewellery heated by energy transfer.

Other systems may require also onboard energy storage, such as batteries, to compensate for periods when the moving element is not sufficiently coupled to a power source.

Accordingly, there is a need for improved systems and methods for providing power to moving elements of a transport/conveyor system.

SUMMARY

According to an aspect herein, there is provided a system for providing power to a moving element on a transport system including: a plurality of moving elements, each moving element including at least one power pick-up panel; and at least one track section with which the plurality of moving elements are associated, the track section including: a control system; a track on which the plurality of moving elements move; and a track power system that is controlled by the control system, wherein the control system and track power system are configured such that the control system controls the track power system to independently transfer power to the power pick-up panels of each of the plurality of moving elements.

In a particular case, the track power system may include a plurality of electro-magnetic coils arranged along the track, the power pick-up panel may include an inductive panel and the control system may be configured to selectively energize the coils independently to inductively transfer power to the inductive panels of each of the plurality of moving elements.

In another case, the control system may be configured to independently switch power on or off to each of the plurality of moving elements.

According to another aspect herein, there is provided a method for providing power to a plurality of moving elements in a transport system, the method including: tracking a position of each of the plurality of moving elements in the transport system; and selectively operating a power system provided to the transport system based on the position of a power pick-up panel provided to the moving element such that power is independently transferred to each of the plurality of moving elements.

According to yet another aspect herein, there is provided a system for providing power to a moving element on a transport system, the system including: at least one moving element including: a moving element drive component; and at least one power pick-up panel; and at least one track section with which the moving element is associated, the track section including: a control system; a track on which the moving element moves; and a track drive component that is controlled by the control system, wherein the moving-element drive component and the track drive component comprise a drive system and wherein the control system and drive system are configured such that the control system controls the track drive component to both move the moving element and transfer power to the power pick-up panel.

In a particular case, the drive system may be an electromagnetic drive system, the track drive component may be a magnetically-driven motor and the power pick-up panel is an inductive panel. In this case, the control system may vary the modulation frequency of an electromagnetic field of the electromagnetic drive system in response to the position of each moving element in relation to the track. Further, the modulation frequency may be set higher to turn off power and lower to provide power. In particular, the lower modulation frequency may be in a range of approximately 0.5 to 10 kHz.

In another variation of this case, the magnetically driven motor may include a plurality of independently controlled electromagnetic coils and the modulation frequency of an electromagnetic field for the plurality of coils may be independently controlled based on a position of each of the plurality of moving elements in relation to the plurality of coils.

According to yet another aspect herein, there is provided a method for providing power to a plurality of moving elements in a transport system, the method including: adapting the plurality of moving elements to receive power from a drive component used to drive the plurality of moving elements along the transport system; and controlling the drive component to provide power to the plurality of moving elements.

In a particular case, the method may further include: tracking a position of each of the plurality of moving elements in the transport system; and selectively operating the drive component based on the position of the moving element such that power is independently transferred to each of the plurality of moving elements.

According to yet another aspect herein, there is provided a moving element for use in a transport system, the moving element including: a plurality of power pick-up panels adapted to receive power from the transport system, wherein the plurality of power pick-up panels are provided in spaced relation with respect to a center point of the moving element and of a plurality of magnetic elements provided to the moving element.

In a particular case, the plurality of power pick-up panels may include one or more inductive coils and the transport system may include an electromagnetic power system for driving the inductive coils to produce power wherein the characteristics of the one or more inductive coils and the quantity of the plurality of power pick up panels is determined based on the amount of power needed on the moving element.

Generally speaking, the embodiments described herein are intended to overcome at least some of the issues with conventional methods by independently supplying power to moving elements by independently controlling source (primary conductor) elements along a transport system in relation to pick-up (secondary conductor) elements on the moving elements using induction. Further, embodiments are included in which the source element is configured to provide energy to move the moving element as well as providing power to the moving element. In particular, the source element provides an electromagnetic field used to provide energy to move the moving element as well as providing an alternating electromagnetic field to transfer power to the pick-up element. For example, the source may be modulated at one frequency for power transfer and another frequency to turn off power transfer while adjusting other characteristics of the electromagnetic field to provide movement or keep the moving element stationary.

BRIEF DESCRIPTION OF THE DRAWINGS

The drawings included herewith are for illustrating various examples of systems and methods for providing power to moving elements in a transport system and are not intended to limit the scope of what is taught in any way. In the drawings:

FIGS. 13A to 13D show diagrammatic representations of a method of providing power to a moving element.

DETAILED DESCRIPTION

Numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein. The embodiments described herein are not intended to be limited to the specific details of any one example embodiment or to specific details that may be common to multiple, or all, example embodiments. The applicants, inventors or owners reserve all rights that they may have in any embodiments disclosed herein, for example the right to embodiments claimed in a continuing application, and do not intend to abandon, disclaim or dedicate to the public any such embodiments by disclosure of this document.

Figure 1:
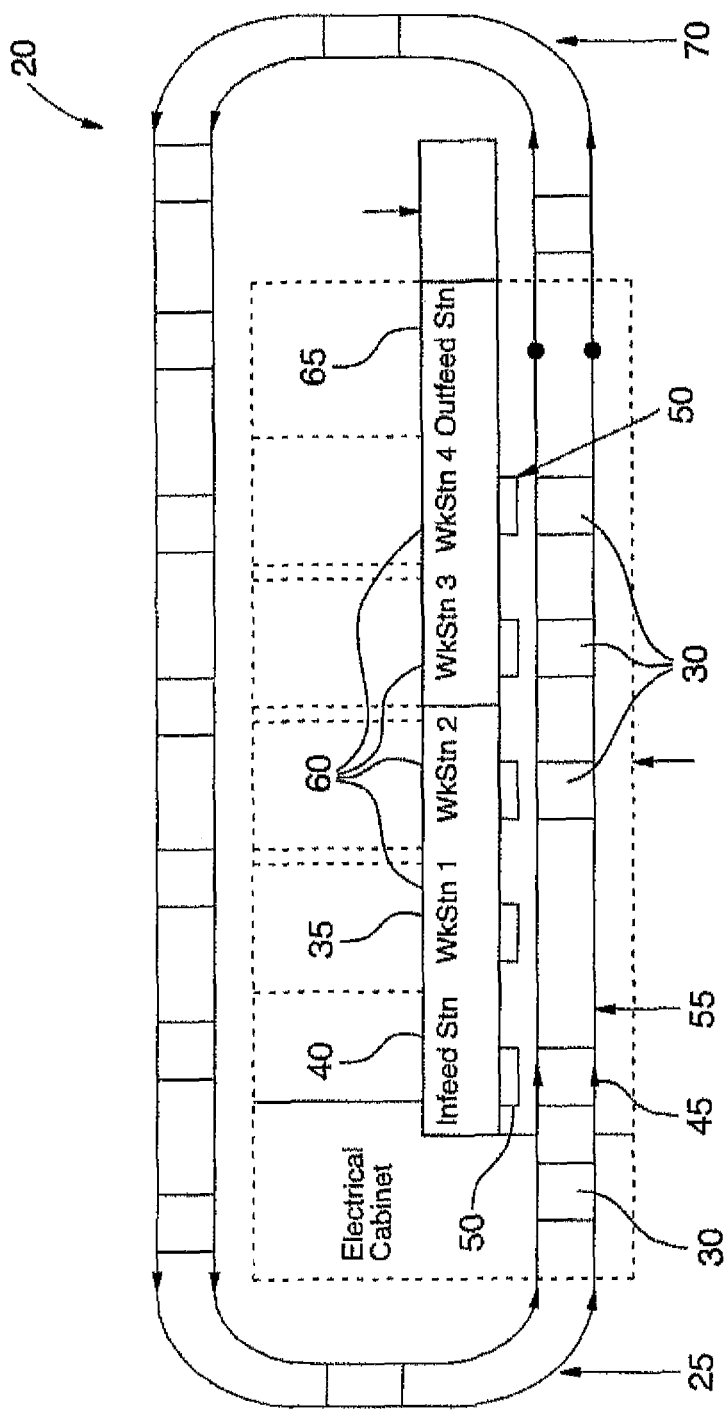
FIG. 1 is a schematic diagram of a transport system, in particular a modular conveyor system.

FIG. 1 shows a general schematic diagram of a modular conveyor system 20, which will be used to provide a general description of the system. It should be understood that other transport systems, such as systems using semi-autonomous vehicles or the like, may also be used with embodiments disclosed herein and the system and method for providing power to a moving element may function equally as well with other appropriate transport systems.

The system 20 includes an infeed conveyor 25, which delivers pallets 30 to a track section 35. The infeed conveyor 25 may be, for example, a belt conveyor, conveyor known in the art, or the like. As the pallets 30 arrive at an infeed station 40, they are detected and held at the infeed station 40 by a holding mechanism 45, such as a gate, lock or the like. In fact, several pallets 30 may be held at the infeed station 40 depending on the operating status of the system 20. A moving element 50 mounted on the track section 35 engages with the pallet 30 at the infeed station 40 and, after release from the holding mechanism 45, the moving element 50 moves the pallet 30 onto a pallet rail 55 that is positioned adjacent the track section 35 and transports the pallet 30 in an independently controlled manner to a workstation 60. As will be understood, the pallet 30 may include some means (not shown) to reduce friction on the pallet rail 55 to allow the moving element 50 to move the pallet 30. At the workstation 60, the pallet 30 is accurately positioned by the moving element 50 and then held in a place by a locking mechanism (not shown in FIG. 1) provided at the workstation 60. The workstation 60 typically includes an apparatus (not shown) such that an operation, for example a pick and place or other operation, can be performed on a workpiece (not shown), such as a part, device or the like that is being carried by the pallet 30. While the pallet 30 remains at the workstation 60, the moving element 50 can be disengaged from the pallet 30 and is free to move and collect a subsequent pallet 30 while another moving element 50 may return to connect with the pallet 30 at the workstation 60. In this way, the movement of each pallet 30 from workstation 60 to another workstation 60 is carried out by moving a plurality of moving elements 50 along the track section 35, each moving element 50 being independently controlled.

Generally speaking, each pallet 30 may then be moved/indexed independently and accurately through any number of workstations 60 (four shown) and via any number of track sections 35 (two shown).

The modularity and independent control provided by the track sections 35 also make it easier to retool the modular conveyor system 20 as each workstation 60 can be provided at any point along the track section 35 and can be adjusted quite easily based on the independent control. Further, the modularity allows for a plurality of track sections 35 to be included together to provide as large a processing area as needed for a particular process and the flexibility to adjust the layout as needed.

Figure 2:
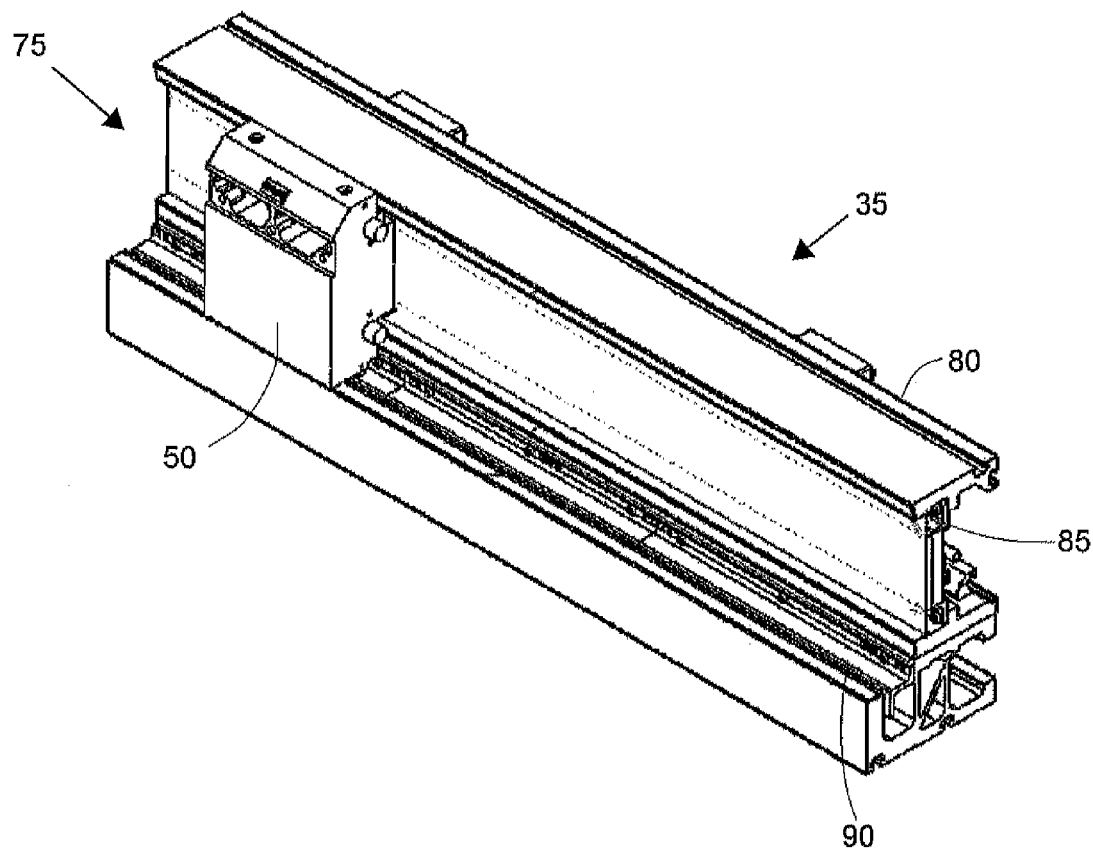
FIG. 2 is a perspective view of a track section of the modular conveyor system of FIG. 1.

FIG. 2 illustrates a track section 35 of the modular conveyor system 20. The track section 35 features one or more moving elements 50 (only one is illustrated) which are configured to ride or travel along a track 75 and stop at workstations positioned along the track 75. The track 75 includes a frame 80 configured to support the moving element 50 on an upper runner 85 and lower runner 90. Some of the principles of operation of the track section 35 are described in more detail in U.S. Pat. No. RE39,747 to Peltier, which is hereby incorporated herein by reference.

The modular conveyor system 20 can be composed of a plurality of track sections 35, which are mechanically self-contained and quickly and easily separable from one another so as to be modular in nature. In this embodiment, the track sections 35 are mounted on a support (not shown) so as to align and abut one another in order to form a longer track. In order to be modular, each track section 35 preferably houses all of the electronic circuitry required to power and control the track section 35.

Figure 3:
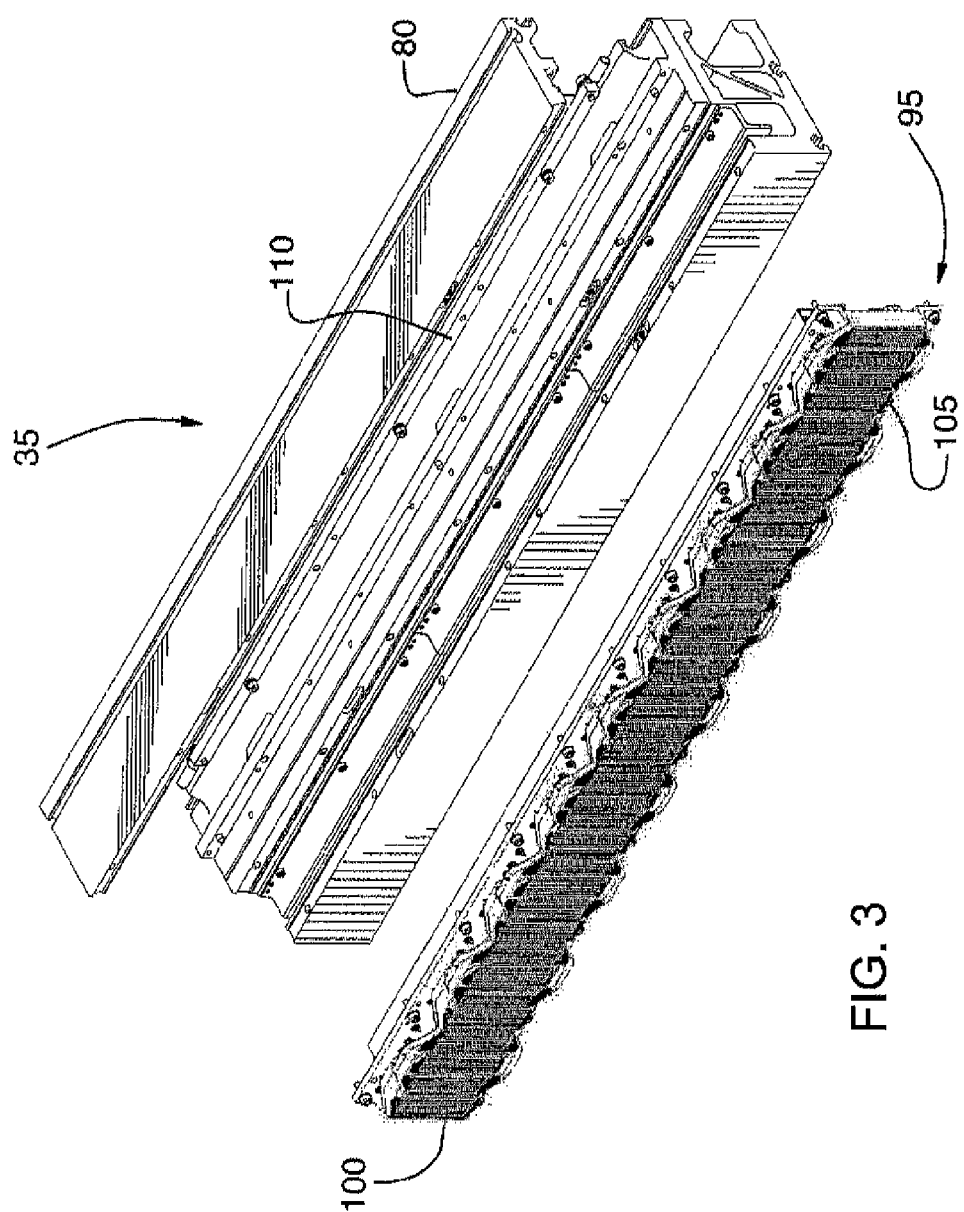
FIG. 3 is an expanded view of the track section of FIG. 2.

FIG. 3 illustrates an expanded view of the track section 35. The frame 80 houses a linear drive mechanism 95 that is formed as a stator armature 100 having a plurality of embedded coils 105 which are individually excited so that an electrically-induced magnetic flux produced by the stator armature 100 is located adjacent to a given moving element 50 to be controlled, in a direction normal thereto, without significantly affecting adjacent moving elements 50. The coils 105 are arranged as a sequence of individual polyphase-like windings or coil sets, wherein coils in each set are overlapped such that the coil centres are spaced apart. The frame 80 also includes a bus bar 110 to provide power to the stator armature 100. The motive force for translating each moving element 50 arises from the magnetomotive (MMF) force produced by each moving element 50 and the stator armature 100, i.e., by the tendency of the corresponding magnetic fluxes provided by the stator armature 100 and moving element 50 to align. A servocontrol system (described below) enables separate and independent moving MMFs to be produced along the length of the track section 35 for each moving element 50 so that each moving element 50 can be individually controlled with a trajectory profile that is generally independent of any other moving element 50. Structurally, the track section 35 may thus be broadly classified as a moving-magnet type linear brushless motor having multiple moving elements 50.

Figure 4A:
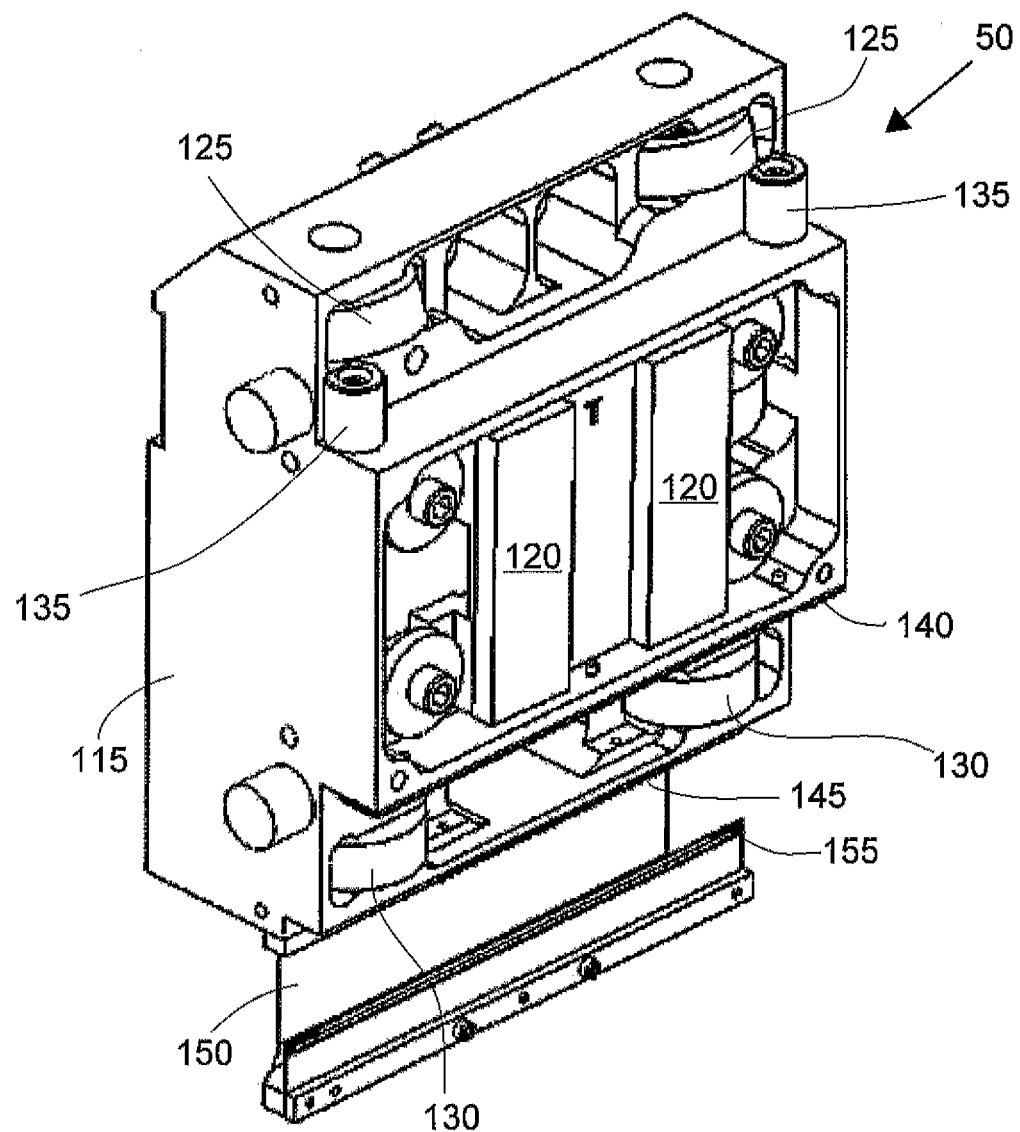
FIGS. 4A and 4B are perspective views of a moving element of the track section of FIG. 2.
Figure 4B:
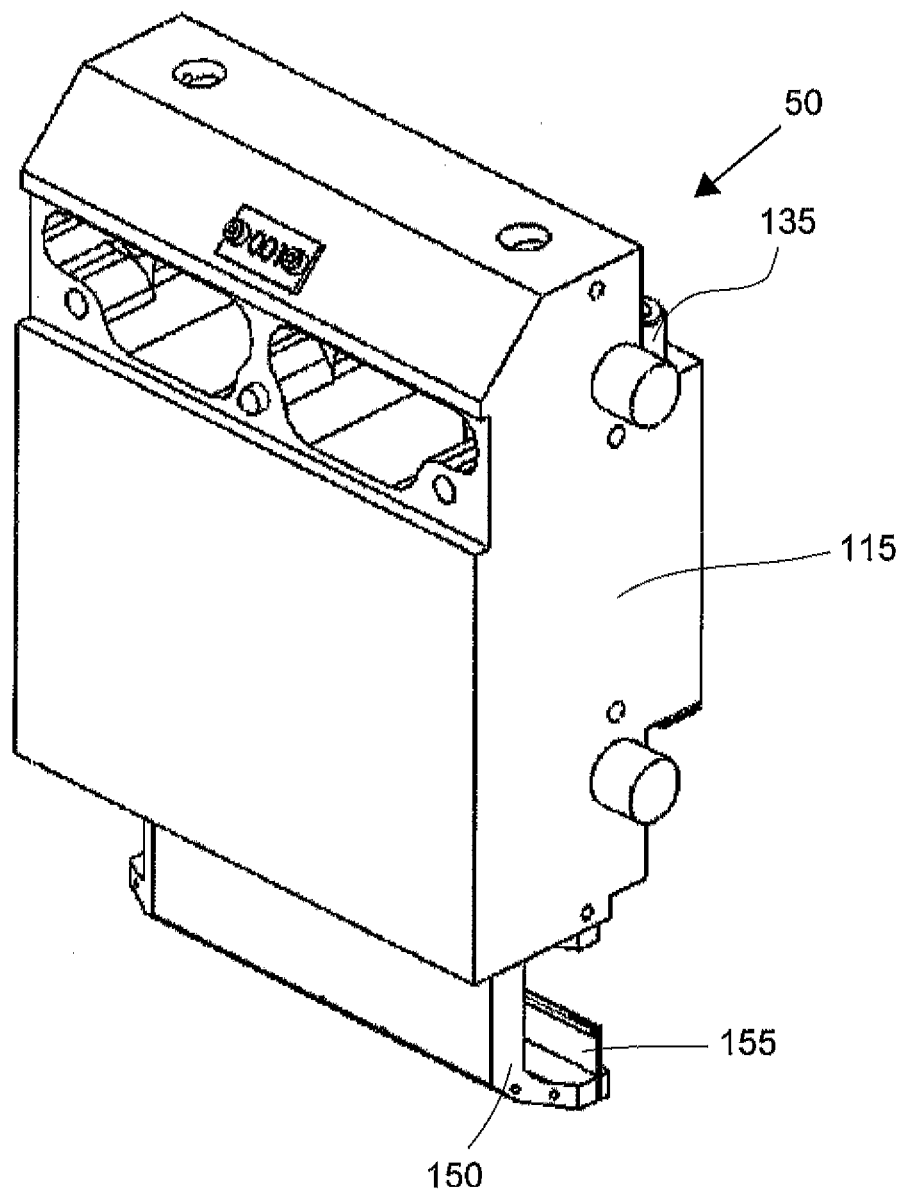
Figure 5:
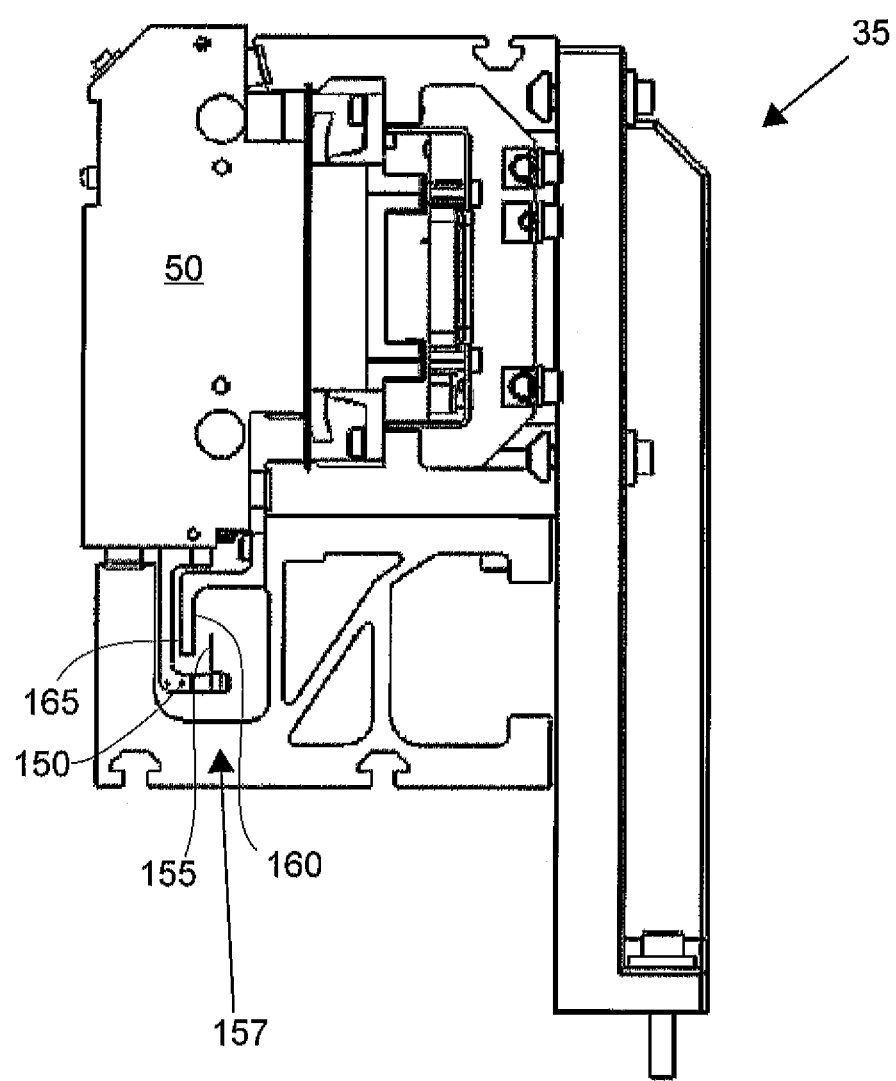
FIG. 5 is a sectional view of the track section, moving element and part pallet.

FIGS. 4A and 4B illustrate perspective views of the moving element 50 and FIG. 5 shows a sectional view of the track section 35, moving element 50 and pallet 30. As shown in FIG. 4A, each moving element 50 includes a body 115 which houses one or more permanent magnets 120 disposed to provide a magnetic flux orientated normal to the track section 35. In the example configuration of FIG. 4A, the magnetic structure of each moving element 50 comprises two thrust-producing permanent magnets 120 arranged in alternating North-South sequence. The permanent magnet material, which may include Neodymium-Iron-Boron, Alnico and ceramic (ferrite) base magnets, is generally selected on the basis of air gap flux densities required and the physical dimensions of the moving element 50 magnetic structure.

As shown in FIGS. 4A, 4B and 5, each moving element 50 features upper wheels 125 and lower wheels 130 which ride along upper and lower runners 85, 90 of track 75. In this particular embodiment, the upper wheels 125 are angled to match with the angled upper runner 80 to provide a downward force on the moving element 50 and help prevent the moving element 50 from separating from the track 75. It will be understood that alternate arrangements may provide the same functionality. The moving element 50 is also provided with anti-tip blocks 135 that can interact with the frame 80 to help prevent the moving elements 50 from tipping if there is a collision or the like. The moving element 50 may also include static brushes 145 that assist with dissipating any build up of static electricity.

As further seen in FIGS. 4A and 5, each moving element 50 includes an extension 150 onto which is mounted an encoder strip 155, which may be, for example, an optically transmissive or reflective strip, a magnetic strip, other type of feedback system or the like. The extension 150 is configured such that the encoder strip 155 interacts with encoder read heads 160 mounted to a corresponding extension 165 extending from the track 75 (see FIG. 5). The encoder read heads 160 are configured to read the encoder strip 155, whether optically, magnetically or otherwise. The encoder strip 155 and encoder read heads 160 form an encoder system 157. The inter-engaging structure is intended to protect the encoder system 157 from the traffic on the track 75 and dust and other debris. The encoder system 157 is employed in the moving element position-detecting subsystem explained in greater detail below. At this point, it should be appreciated that by placing the encoder read heads 160 on track 75 and not on moving elements 50, the moving elements 50 are not tethered in any way and thus their mobility is not restricted.

Figure 6A:
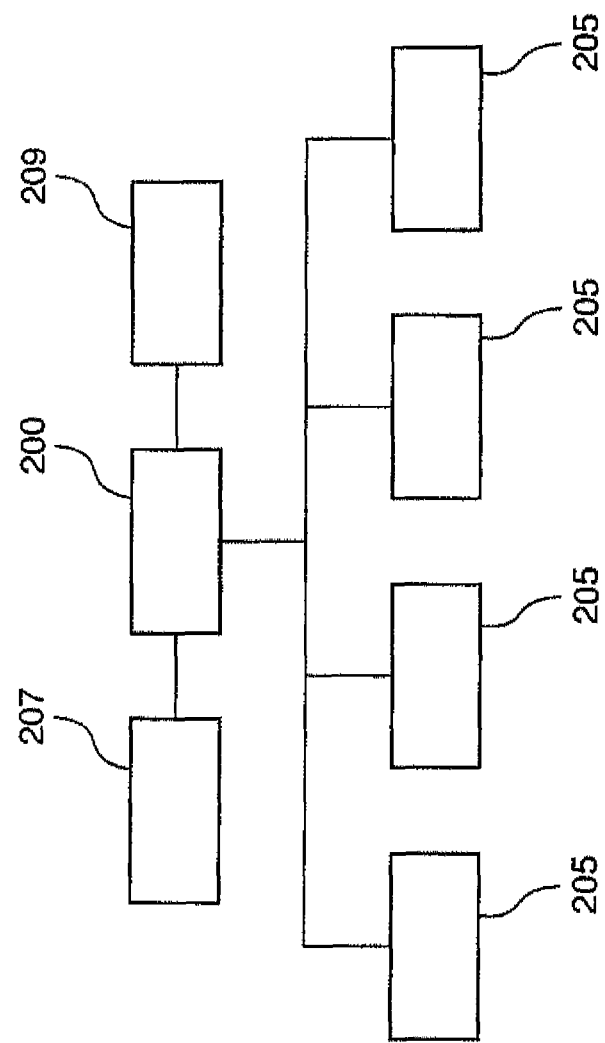
FIGS. 6A and 6B are block diagrams of an example distributed control architecture for controlling the track section of FIG. 2.

FIG. 6A is a block diagram of an example control architecture employed in the conveyor system 20. As shown in FIG. 6A, the conveyor system 20 includes a central controller 200 that controls the overall conveyor system 20 and a section controller 205 for each of the track sections 35 used in the conveyor system 20 (four section controllers 205 are shown). As described above, the conveyor system 20 can be formed from a plurality of modular track sections 35, representing control zones, which are controlled by a section controller 205. The central controller 200 may monitor destination data for the moving elements 50 (which are preferably uniquely addressed) and receive acknowledgement messages in return when moving elements 50 have reached their destinations. As such, the central controller 200 may be used for process (i.e. manufacturing-line) control. The central controller 200 may also provide a supervisory diagnostic role by monitoring the section controllers 205 (e.g., by engaging in a continuous polling process) in order to determine whether any section controller 205 has failed. It will also be understood that the central controller 200 may also provide control for the infeed conveyor 25 and outfeed conveyor 70, for example via infeed controller 207 and ouffeed controller 209.

Figure 6B:
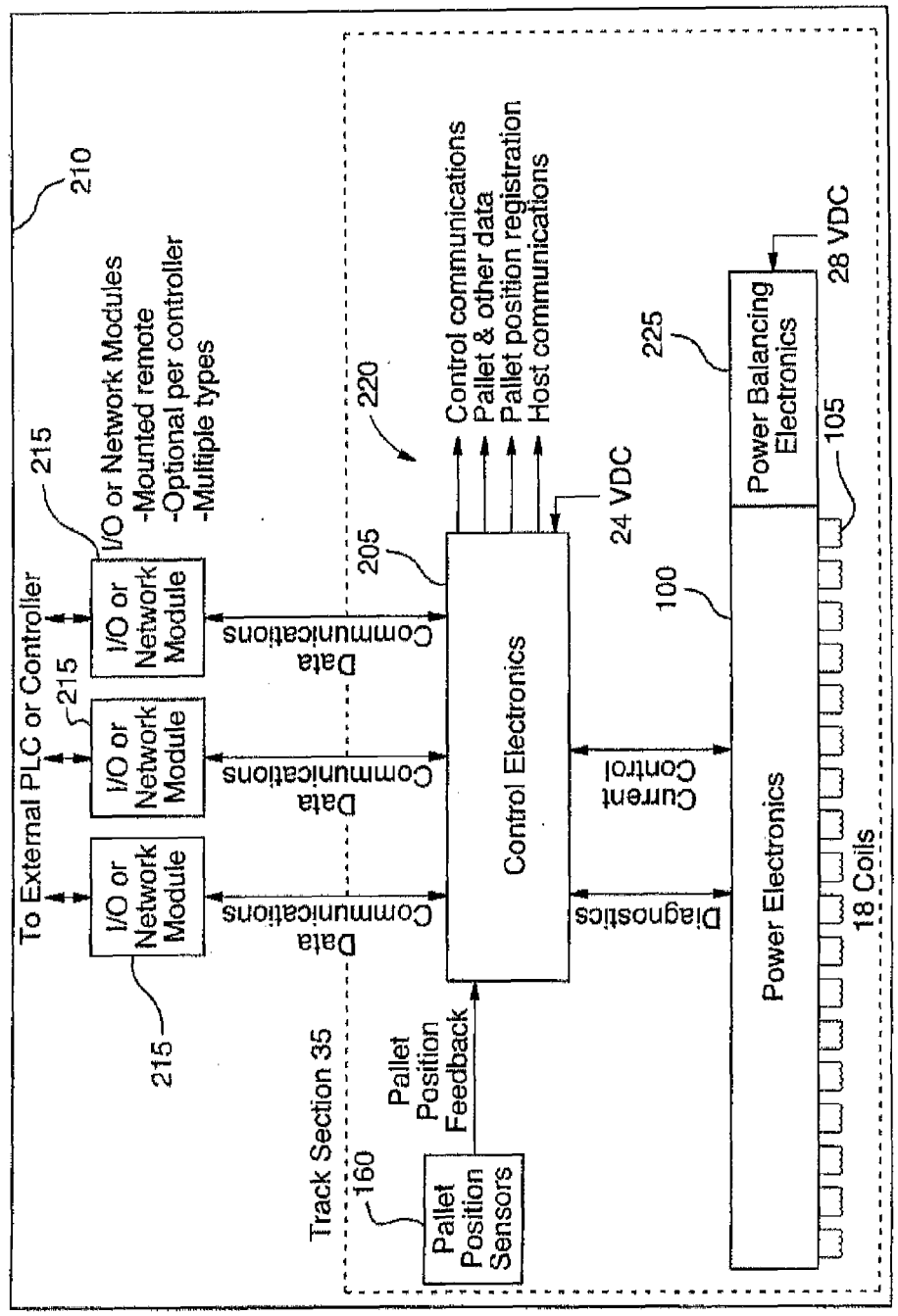

FIG. 6B is a block diagram of an example control system 210 for a track section 35. The control system 210 includes the section controller 205 that is connected to the central controller 200 via, for example, an input/output (I/O) or network module 215. In this embodiment, the section controllers 205 are connected to one another in a peer-to-peer communications network such that each section controller 205 is connected to preceding and following section controllers 205 through communications link 220. It will be understood that other alternative embodiments may include use of the central controller 200 to convey information/data between section controllers 205 or the like.

The section controller 205 may also be connected to other devices, such as programmable logic controllers (PLCs) (not shown) via, for example, input/output (I/O) or network modules 215. The PLCs may provide manufacturing-line station-processing instructions to the track section 35, such as directing the next destination for a moving element 50 along the track 75, or providing station-specific motion instructions in respect of a given moving element 50 stopped adjacent to a workstation 60. For instance, a typical two-axis station controller or PLC may operate by providing pulse signals in order to synchronize the motion of a moving element 50 along the track 75 with the motion of a station end effector (not shown) or the like moving along a transverse axis, whereby each pulse represents an incremental move command for the moving element 50. It will be appreciated that the provision of the direct connection to the PLC reduces the amount of bandwidth that would otherwise be required to communicate this information through the central controller 200, thereby substantially eliminating a potential limitation on the length and processing capabilities of the track section 35.

As illustrated, each section controller 205 is connected to the stator armature 100 and coils 105 in the corresponding track section 35 and controls the coils 105 independently, in order to control an adjacent moving element 50, for example, with an independent trajectory or "move" command.

Each track section 35 also includes power balancing electronics 225 that may include, for example, current amplifiers, current sensing circuitry, temperature sensor, voltage sensors and the like. The section controller 205 may periodically poll the power balancing electronics 225 in order to obtain diagnostics data provided by these sensors.

Each section controller 205 is also connected to the encoder read heads 160 situated in the track section 35. The section controller 205 is used to implement a closed-loop digital servo control system that controls movement of the moving element 50 by resolving the absolute position of each moving element 50 located in its track section 35. The section controller 205 makes use of a moving element position feedback subsystem, which supplies measured moving element position data to the section controller 205. Referring to FIGS. 4A, 4B and 5, when the encoder strip 155 of a given moving element 50 moves over a given encoder read head 160, signals are produced and cause the section controller 205 to update the position of the moving element 50 in accordance with the direction of travel of the encoder strip 155. The section controller 205 provides processing for sampling the encoders 160 and resolving the position of each moving element 50 located in the associated track section 35. Broadly speaking, the processing associates the encoder strip 155 of any given moving element 50 with only one encoder 160 at any time so that the absolute position of the given moving element 50 can be calculated based on a fixed position of the associated encoder (or more specifically its read head 160) and a relative position of the encoder strip 155 in relation to the associated encoder 160. In addition, when the encoder strip 155 simultaneously engages two encoders 160, the processing transfers or hands-off the association or "ownership" of the moving element 50 from the current encoder 160 to an adjacent engaged encoder 160. In this manner, the position of a given moving element 50 can be continuously tracked across the control zone. When a moving element 50 crosses control zones, a similar process occurs, with the addition that the adjacent section controller 205 creates a data structure to keep track of the position of the given moving element 50, and, once the hand-off is completed, the data structure for the moving element 50 in the (now) previous control zone is deleted.

As one example, if a 400 lines-per-inch graded encoder strip 155 moves one inch through a given encoder read head 160, such movement will cause an associated counter to change by +/−400, depending on the direction of travel. This type of encoder read head 160 as well as the associated encoder strip 155 are commercially available, for instance, from US Digital of Washington, U.S.A. The encoder strip 155 may further include an incremental encoder portion (not shown) having a plurality of index points staggered along the strip such that the moving element 50 can be located based on reading as few as two index points.

Those skilled in the art will appreciate that the encoder system 157 may be optical or may be another alternative system. For example, a passive readable device can be a magnetic strip and the encoder read heads can be corresponding magnetic detectors. Such an alternative embodiment may provide very fine resolution.

When dealing with magnetic linear drive systems such as that described above, one issue can be the addition or removal of the moving elements 50. In order to overcome this concern, a modular track section may be provided with an extension, for example, approximately 300-600 mm (12-24 inches) long, that is not provided with an encoder or motor section. For removal or addition, the moving element 50 can be manually moved to this extension section and removed or placed on this extension section and pushed back onto a powered track section.

Each track section 35 or each combination of track sections 35 can be provided with both mechanical and software limits in order to prevent moving elements 50 from running off at the end of the track section 35 or combination of track sections 35.

As the modular conveyor system 20 includes both powered track sections and mechanical infeed and outfeed conveyors, operator stations can be provided outside of a guarded area that may be provided for the higher power track sections 35 which provide the independent control. This provides for greater safety for operators. The use of mechanical infeed and outfeed conveyors allows for more buffering flexibility in between areas on the manufacturing line. For example, a conventional conveyor may be placed in between two linear-drive areas to allow for cheaper buffering if one linear-drive area is stopped for any reason. The appropriate use of buffering can improve overall equipment effectiveness (OEE).

This combination modular conveyor system 20 has advantages over conventional systems in that the pallet size is not limited by the chassis pitch and multiple parts can be provided on one pallet. On the track sections 35, each moving element 50 can be moved independently to allow for offsetting at one workstation 60 while performing a multi operation at another workstation 60 and full access to the part from all sides is provided within the track sections 35. Further, because of the accurate indexing on the track sections 35, the moving element 50 may provide x-axis movement to provide for coordinated motion with y and z axes devices at the workstation 60.

Figure 7:
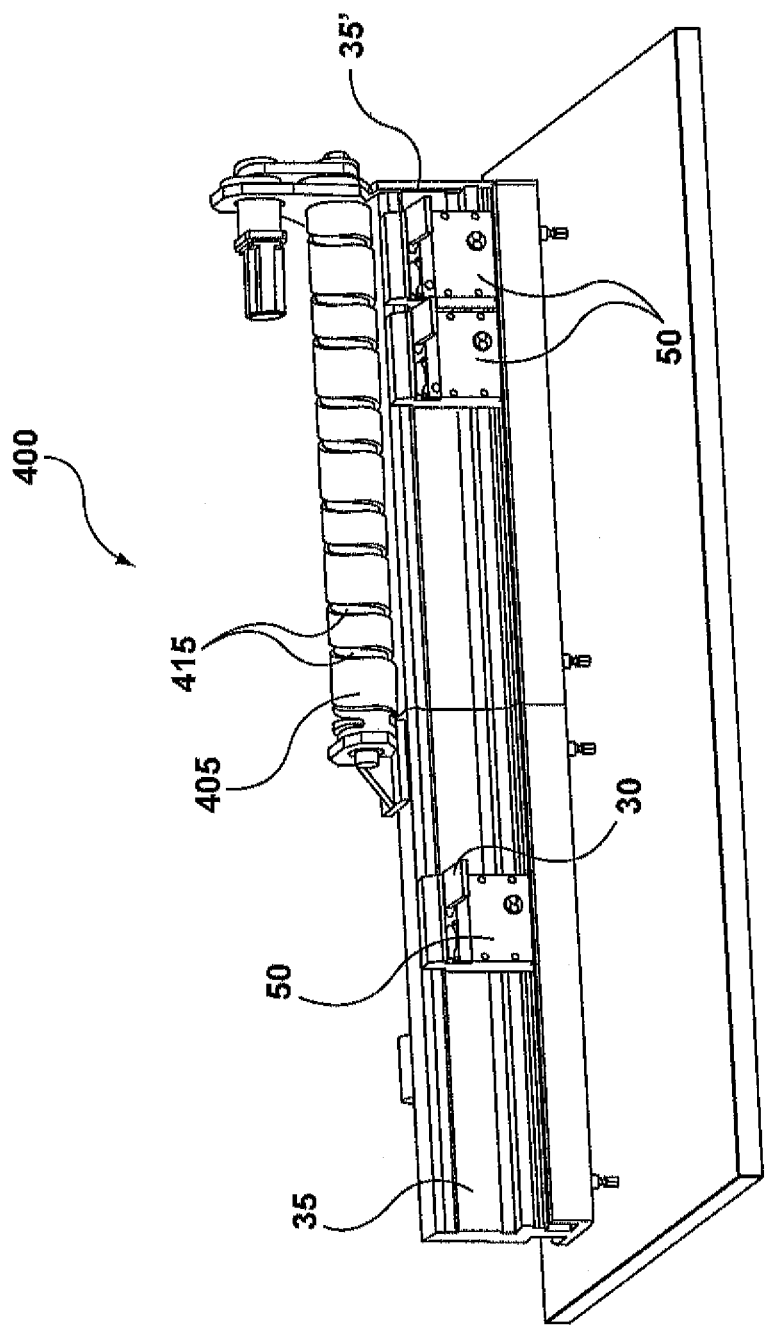
FIG. 7 illustrates another embodiment of a modular conveyor system in which a powered track section is used with an unpowered track section including a scroll cam drive system.

FIG. 7 shows a further embodiment of the use of modular track sections 35 together with a mechanical conveyor 400. In this case, rather than a conventional belt conveyor, the mechanical conveyor 400 comprises a scroll cam 405 provided to a modular track section 35' that has had the linear drive removed (or alternatively, turned off), referred to as an unpowered track section 35'.

An intended advantage of the embodiment of FIG. 7 is being able to run non-synchronous (powered track section) to synchronous (unpowered track section) without a change over to a different track system. It is possible to run smoothly from non-synchronous to synchronous (sometimes called "continuous motion") and back to non-synchronous or alternatively, to start with synchronous and then to non-synchronous, all in a single modular track environment. It will be understood that the modularity of the track sections 35 and 35' make it possible to have any required number of drive system changeovers succeeding one another in order to create an assembly line or the like.

Figure 8:
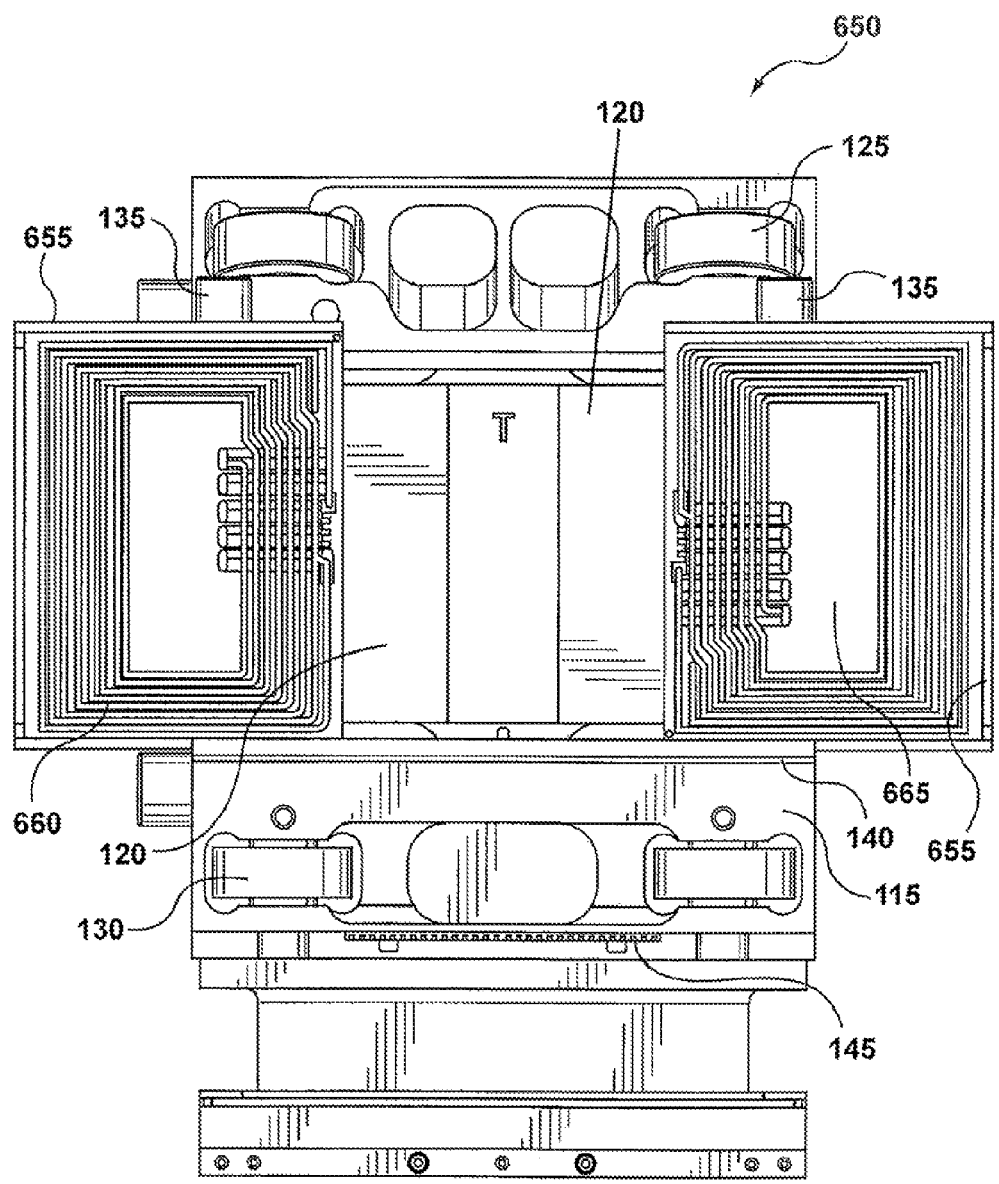
FIG. 8 illustrates a perspective view of a moving element according to another embodiment.

FIG. 8 illustrates another embodiment of a moving element 650. Similarly to the moving element 50 shown in FIGS. 4A, 4B and 5, each moving element 650 includes a body 115, which houses at least one permanent magnet 120. The at least one magnet 120 provides a magnetic flux orientated normal to the track section 35. Other elements of the moving element 650 are also similar to the moving element 50, unless otherwise indicated.

In this alternative embodiment of the moving element 650, shown in FIG. 8, the moving element 650 is provided with at least one power pick-up panel 655. In some cases, the power pick-up panel 655 may be referred to as an energy pick-up element, an inductive pick-up element or an inductive panel. In the current embodiment, inductive transfer of power is used and in this case, two induction panels 655 are provided to and protrude from the body 115 of the moving element 650. As shown in FIG. 8, the two induction panels 655 are incorporated on either side of the moving element 650, and adjacent to the at least one magnet 120 in the longitudinal direction of the track section 35. In this case, the induction panels 655 are approximately equidistant from a center line of the moving element 650. This arrangement can allow for a balancing of the provision of inductive power as explained in further detail below. It will be understood that a plurality of induction panels 655 may also be used.

The induction panels 655 include at least one induction pick-up coil 660. The induction panel 655 also include one or more ferrite cores 665. The field of induction coils is well known and an appropriate coil and/or ferrite core arrangement can be chosen depending on the required power transfer.

As noted above, the linear motor 95 used in the present embodiment allows for individual control over each linear motor coil 105 in a track section of the transport system (for example, 18 coils per 900 mm section), see, for example, FIG. 3. This individual control allows each moving element 650 to be directly controlled by the linear motor coils 105 that are in the vicinity of the moving element 650. Linear motor coils 105, which do not have a moving element 650 in their vicinity, are generally controlled to produce no substantial magnetic field.

This individual control over each linear motor coil 105 contrasts with conventional magnet linear motors, which typically connect groups of coils in a series/parallel arrangement to produce one or more sections in which all of the moving elements on a single section experience the same motive forces and thus move substantially together as a group. In these conventional systems, typically only moving elements on different sections can be moved independently, at best.

In the present embodiment, the linear motor coils 105 are normally driven using pulse width modulation (PWM) at a higher frequency, for example 20 kHz, in order to provide an electromagnetic field to drive the moving elements 650. The higher frequency of modulation is used such that, when combined with the coil inductance, the linear motor coil 105 produces a generally smooth magnetic field with relatively little AC ripple. This is advantageous to reduce eddy current losses and because excessive magnetic ripple could cause vibrations of the moving elements and make accurate positional control difficult.

In order to be able to provide inductive power transfer, however, an alternating electromagnetic field is used to couple a source coil, (in this case, the motor coils 105) and a pick-up coil (in this case, pick-up coils 660). As described below, placing pick-up coils 660 just before and after the magnets 120 of the moving element 650 and reducing the frequency of PWM for motor coils 105 in the vicinity of the pick-up coils 660, inductive power transfer can be implemented without significant additional materials and without significant impact on the position control system.

Since the use of the linear motor coils 105 to drive the moving elements 650 is designed to minimize ripple by providing a smooth magnetic field and stable positioning (for example, using 20 kHz modulation), the AC ripple component of the linear motor coils 105 would generally be insufficient to couple any useful amount of power to the pick-up coils 660. However, by reducing the modulation frequency (for example, to approximately 1 kHz) of only the linear motor coils 105 under the pick-up coils 660, the AC ripple component (i.e. varying electromagnetic component) of the field can be increased to allow appropriate levels of power to be transferred to the pick-up coils 660 of the moving element 650. Power can be provided to the moving element 650 when it is stationary, or may be used to aid the movement of the moving element.

Figure 9:
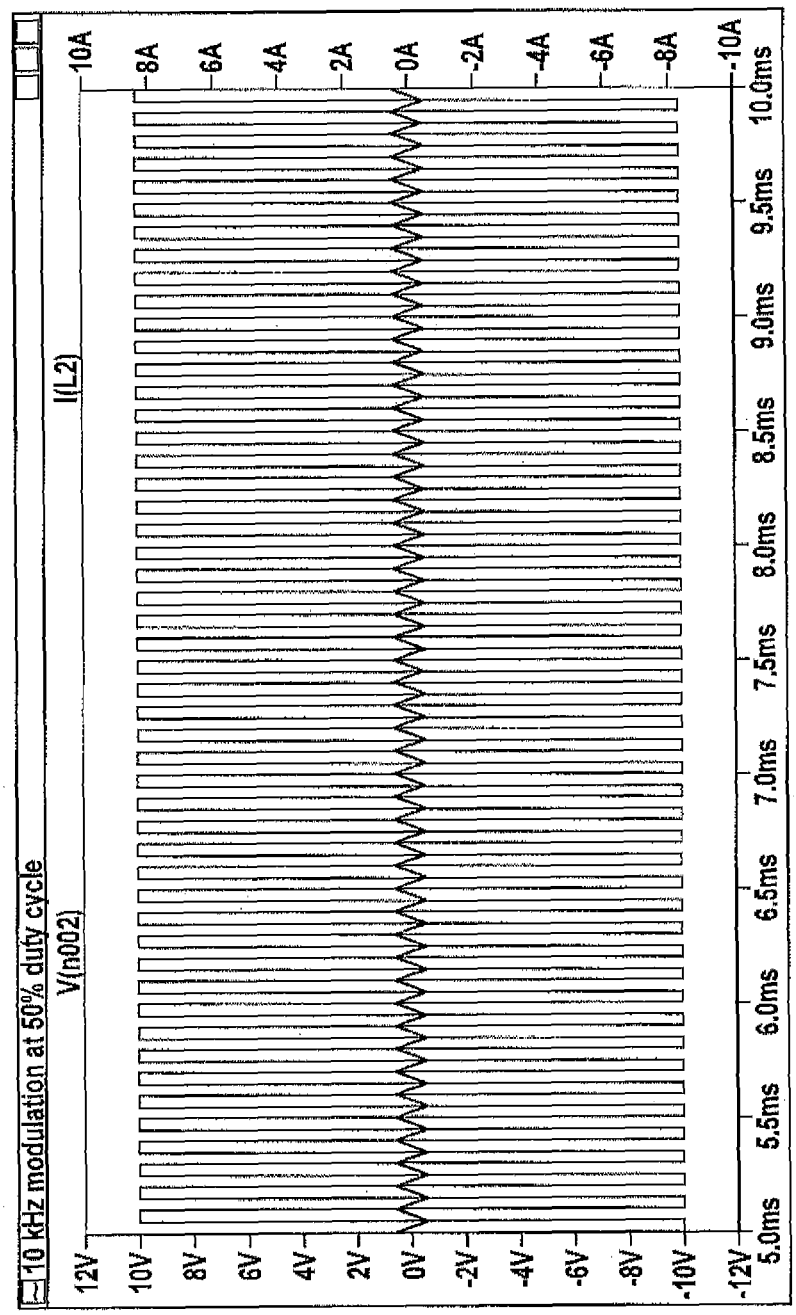
FIG. 9 shows a graph illustrating the average current at a 50% duty cycle and 10 kHz modulation frequency.

FIGS. 9 to 12 illustrate graphical representations of the effect of modulation frequency and pulse width modulation duty cycle. FIG. 9 illustrates a motor coil regulated at 50% duty cycle and 10 kHz modulation frequency. It can be seen that the average current is zero and that there would be a small ripple current. A motor coil (105) operating in this way would typically not have an impact on a moving element 650 because the average current is zero (i.e. no net magnetic field, which would mean no force and therefore no movement) and minimal ripple current (i.e. no power induction).

Figure 10:
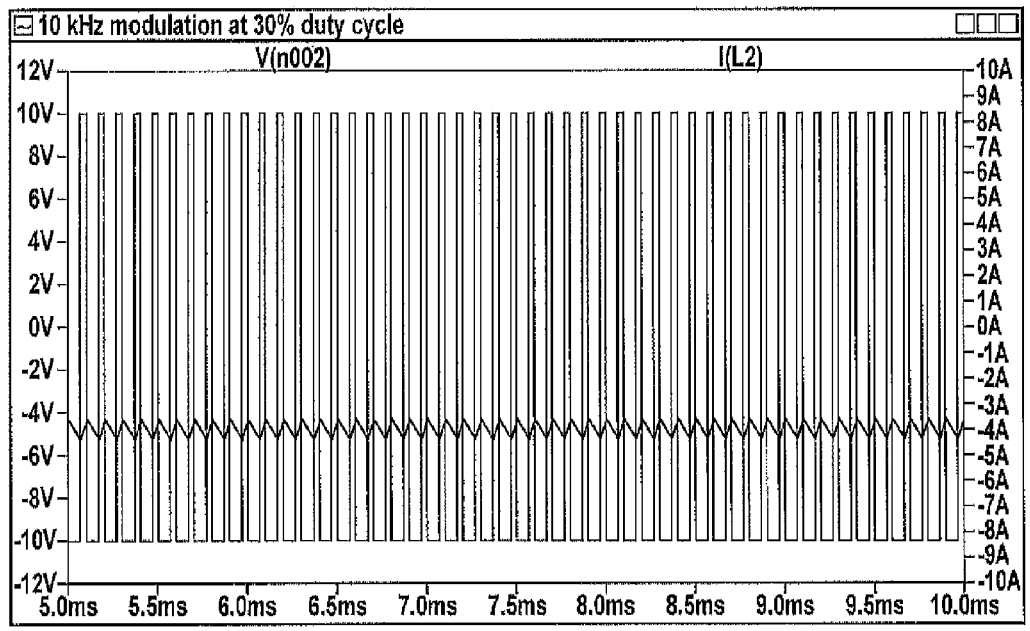
FIG. 10 shows a graph illustrating the average current at a 30% duty cycle and 10 kHz modulation frequency.

FIG. 10 illustrates a coil at 30% duty cycle and 10 kHz modulation frequency. In this case the average current can be seen at negative 4 amps. In this case, there will be a net magnetic field and the moving element 650 will move accordingly. Note that a full range of duty cycle may be used, 99% for maximum forward force and 1% for maximum reversing force. As in FIG. 9, there is a small ripple current of a similar magnitude. The net resulting magnetic field may still have a ripple component but will have a predominant offset value, which will apply an accelerating force to the moving elements in the vicinity. Similar to the situation in FIG. 9, a pick-up coil placed in the low ripple magnetic field generated as shown in FIG. 10 would have negligible voltage induced in it.

Figure 11:
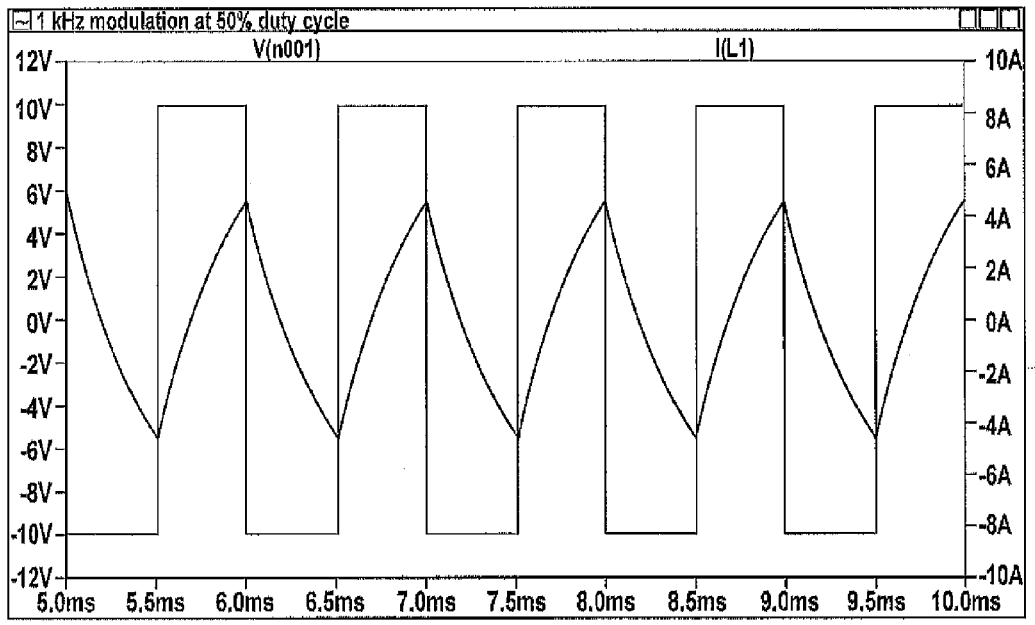
FIG. 11 shows a graph illustrating the average current at a 50% duty cycle and 1 kHz modulation frequency.
Figure 12:
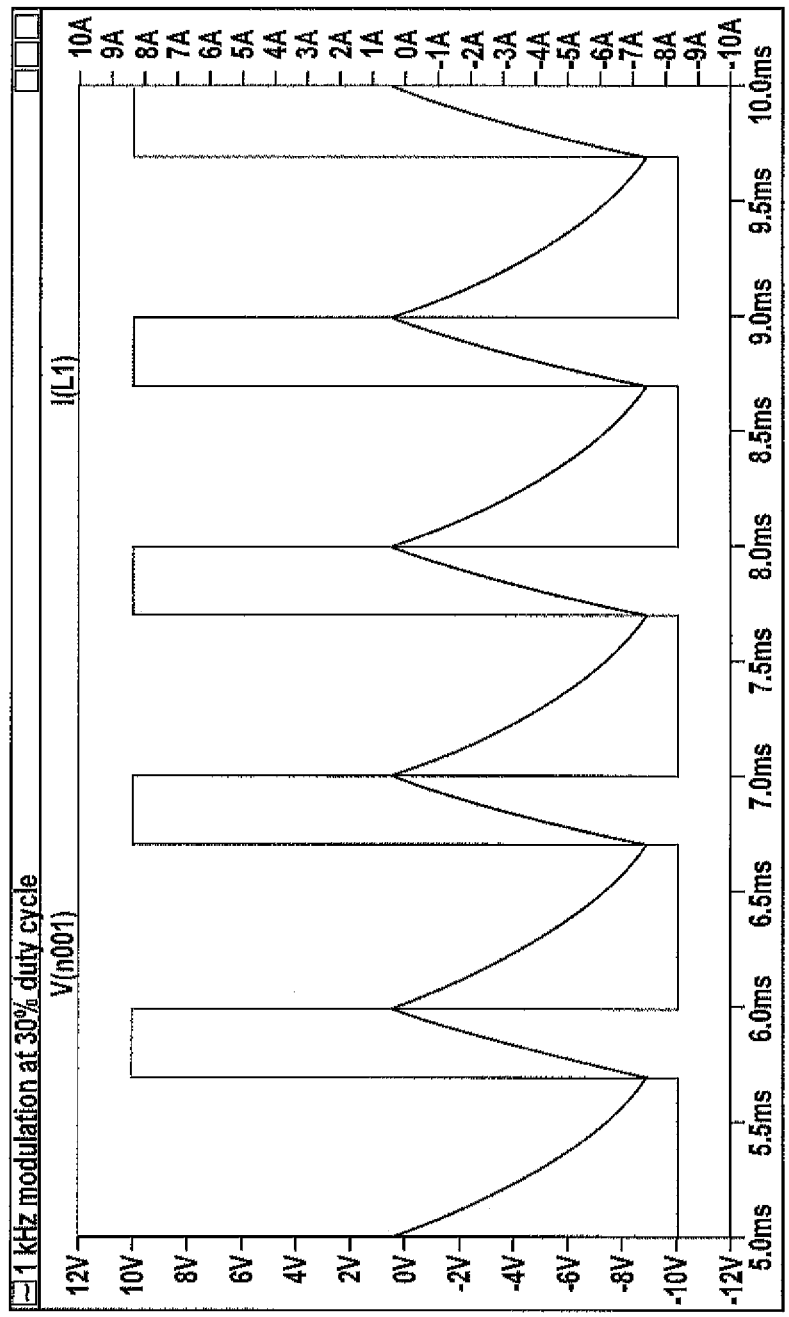
FIG. 12 shows a graph illustrating the average current at a 30% duty cycle and 1 kHz modulation frequency.

FIG. 11 and FIG. 12 show a coil at a 50% and 30% duty cycle respectively, both at a 1 kHz modulation frequency. At this modulation frequency a larger ripple current is created. At a 50% duty cycle, the net resulting magnetic field has a significant alternating (ripple) component, but the average field remains zero. A pick-up coil in this magnetic field would have an alternating voltage induced in it but the average magnetic field (accelerating force) would remain at approximately zero. At a 30% duty cycle, the net resulting magnetic field has a predominant offset value as well as a significant alternating (ripple) component. The offset value has an accelerating force on the moving elements 650 in the vicinity. As above, a pick-up coil placed in this magnetic field would have an alternating voltage induced in it. Thus, the use of a lower modulation frequency can provide power to pick-up coils, while limiting the impact on the positional stability or movement of the moving element.

The selection of the higher and lower frequencies depends on variables, including, for example, motor inductance, pallet air gap, pickup inductance, and coil drive electronics. For some cases, a PWM frequency range may be between 10 and 30 kHz when only moving the moving elements 650. In other cases, the nominal PWM frequency range may be between 20 and 22 kHz, while for a specific case, 21.5 kHz may be appropriate. These frequency ranges may be used when not providing power due to somewhat smoother control of movement at higher frequencies but are not required. With regard to power transfer (which may also involve movement), an example range of 0.5 to 10 kHz may be useful. In other cases, the range used may be between 4 and 6 kHz, while for a specific case, 5.375 kHz may be appropriate.

As a moving element 650 moves along the track section 35, the control electronics (control system) 205 control the operation of the linear motor coils 105 to both move and position the moving element 650 and provide power to the moving element 650. In particular, the control electronics 205 control which linear motor coils 105 should be modulated at reduced frequency so that power is continually transferred to the moving element 650. As there is individual control over the linear motor coils 105, the linear motor coils 105 that have no moving element 650 (or, more precisely pick-up coil 660) over or near them will produce little AC or DC electromagnetic field and, in appropriate cases, may be turned off resulting in power savings. It will be understood that the linear motor coils 105 may also be used only to provide power to a stationary moving element 650 or to a moving element 650 that is being advanced using another technology such as that shown in FIG. 8.

FIGS. 13A to 13D are diagrammatic representations of an example of the movement and provision of power to a moving element. In these figures, motion is from left to right. The linear motor coils 105 or portions of these coils, which are under the magnet poles 700 at any point in time, may be modulated to produce the force required to maintain the moving element 650 at its desired position.

Figure 13C:
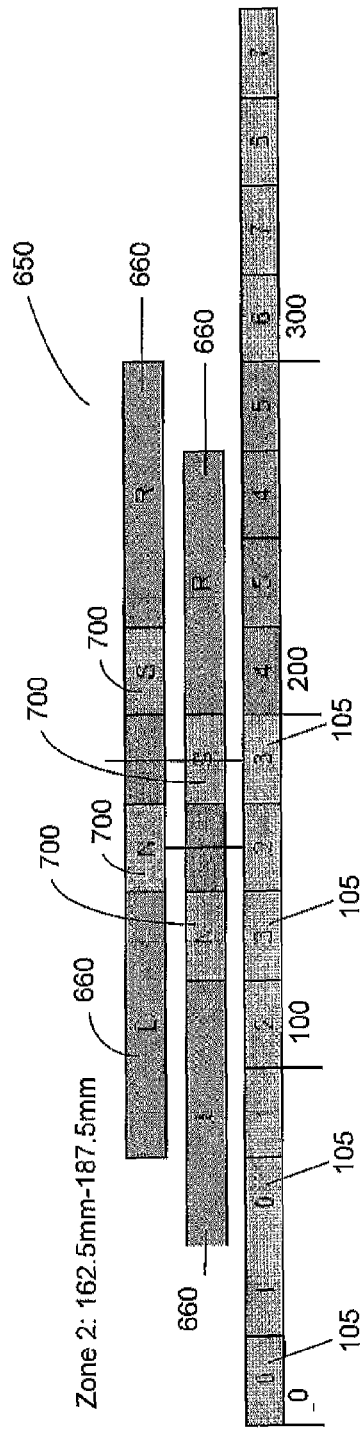

In FIG. 13A, the upper two bars represent the moving element at two different times; in this figure the moving element 650 is shown in transition from 112.5 mm to 137.5 mm. The upper bar shows the moving element 650 after the moving element 650 is advanced 25 mm in relation to the lower bar. The left and right pickup coils 660 are labelled L and R, the magnet poles 700 are labelled N, for north and S for south, and the dark gray portion in the middle of the moving elements is a physical gap. The third (lowest) bar in FIG. 14A represents the motor coils 105 of the linear motor. FIG. 12 shows a detail view of the motor coils 105 in relation to the diagrammatic representation. On the third bar, the motor coils 105 labelled 0, 1, 2, 3, 4, 5, and 6 are modulated at the optimal frequency to provide motive force and/or power transfer. When coils are positioned in front of the pickup coils L and R, they are modulated at a lower frequency to enable power generation. When coils are not located in front of the pickup coils L and R, they are modulated at high frequency for optimal motive force. Each of FIG. 13B, 13C and 13D use a similar arrangement.

Figure 13D:
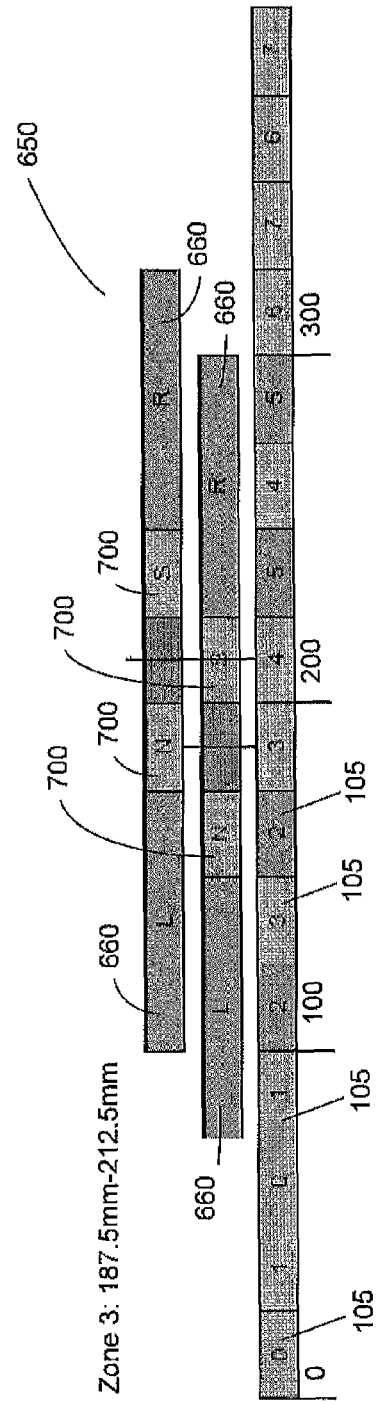

In FIG. 13A, for the lower bar at position 112.5 mm, coils 0, 1, 2, 3, and 4 are modulated at a lower frequency to enable both power transfer and pallet movement. For the upper bar at position 137.5 mm, coils 0, 1, 3, 4, and 5 are modulated at a lower frequency to enable both power transfer and pallet movement. In FIG. 13B, for the upper bar at position 162.5 mm, coils 0, 1, 2, 4, and 5 are modulated at a lower frequency to enable both power transfer and pallet movement. All of the remaining coils in the above example are modulated at high frequency. FIGS. 13C and 13D are similar and illustrate the way that power can be continuously provided to the moving element even while moving.

Figure 14:
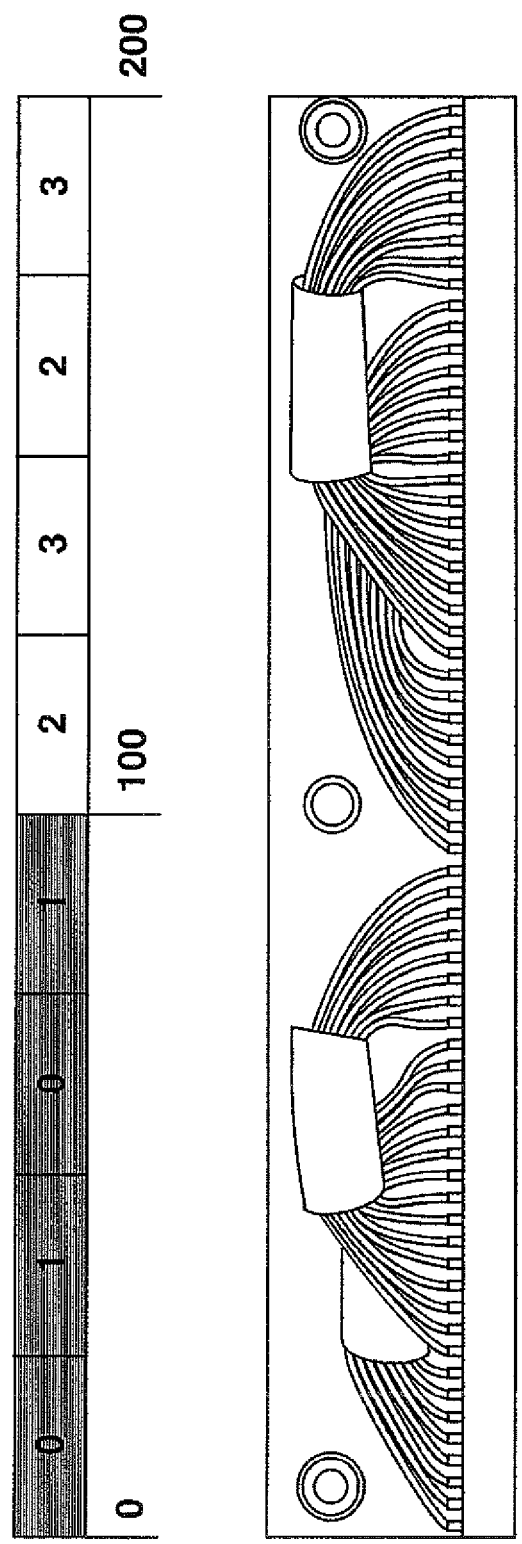
FIG. 14 illustrates coils of a linear motor in relation to the diagrammatic representation of FIG. 13.

FIG. 14 shows detail of an actual electromagnetic drive in relation to the charts of FIGS. 13A to 13D The power transfer to an individual moving element 650 can be turned on or off at any location at any time. To turn off the power transfer, the system could, for example, switch the coils 105 that are adjacent the pickup coils 660 to high frequency modulation. Similarly, the system can restore power transfer to a moving element 650 by, for example, returning the coils 105 adjacent the pickup coils 660 back to low frequency modulation. Overall, it is clear that independent control of the coils 105 allows for independent control of the pick-up coils 660. It will also be understood by one of skill in the art that the pickup coils 660 can operate, i.e. be receiving power, even if not positioned directly over the coils 105.

The combination of two outboard pickup coils and the above frequency modulation scheme are intended to allow for a near constant voltage to be available on the moving element, irrespective of the position of the moving element 650 and without the need for any on-pallet energy storage. By providing an appropriate configuration and adjusting the frequency, the system is intended to provide consistent power transfer and consistent motive force and minimize jitter.

The motor coils 105, when located under the magnet poles 700, produce the positioning force and may be duty-cycle modulated based on how quickly a moving element 650 is required to change its position. A 50% duty cycle could correspond to idling, while 99% may be full acceleration and 1% may be full acceleration in reverse. It will be understood that movement of the moving element can be achieved at various frequencies by appropriately adjusting the duty cycle as such, the ability to move the moving element and provide power to the moving element can be provided independently.

The motor coils 105 located adjacent to the induction panels 655 provide power to the moving element. In one embodiment, approximately 10 watts of power may be transferred to a moving element 650 without resulting in any degradation in position control. In some cases, slightly more heat may be generated in the motor coils 105. In determining, the amount of power to be transferred, it will be understood that transferring larger amounts of power may result in shaking and uttering of the moving element 650, such that the total amount of power transferred may be related to the ability of the system to accept loss of positional accuracy and heat losses in the motor coils. It will be understood that less or more than 10 watts of power may be provided depending on the design parameters of the transport system. Further, because of individual control of the motor coils 105, different levels of power may be provided to individual moving elements 650 even on a single track section of the transport system. The ability to control the power of each individual moving element may be advantageous in many situations, for example, when there are different power requirements at different stations within an assembly line.

In another embodiment, the transport system may be one in which all the moving elements on a specific track section do not have independent control. In this case, the power transfer may occur to the moving elements by changing the pulse width modulation frequency of the track section once the moving elements have reached their desired position. This would allow power transfer to the moving elements 650 from the motor coils 105 when the moving elements 650 are held in position.

While the moving elements 650 are held in position, the power received from power transfer may be used in a variety of possible applications. For example, the power may be used to run a pump to generate vacuum and/or air pressure that is stored in a sealed chamber for use in processing; illuminate LED or other types of lighting; and/or power rotary motors, linear motors, ceramic motors, coils, and other electrical devices.

The embodiments herein have been disclosed with a certain degree of particularity for the purpose of description but not of limitation. Those skilled in the art will appreciate that numerous modifications and variations can be made to the embodiments without departing from the spirit and scope of the application.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

While the above description provides examples of one or more processes or apparatuses, it will be appreciated that other processes or apparatuses may be within the scope of the disclosure. It will also be understood that the processes and apparatuses may be implemented using hardware or software components or an appropriate combination thereof. Software may be provided as instructions on a physical computer medium or the like for execution on a processor of a computing device.

We claim:

1. A system for providing power to a moving element on a transport system comprising:
    a plurality of moving elements, each moving element comprising at least one drive component and at least one power pick-up panel; and
    at least one track section with which the plurality of moving elements are associated, the track section comprising:
        a control system;
        a track on which the plurality of moving elements move; and
        a track power system that is controlled by the control system, the track power system comprising a plurality of electromagnetic coils;
    wherein the control system and track power system are configured such that the control system controls the plurality of electromagnetic coils to:
        independently control movement and a position of each of the plurality of moving elements by pulse width modulation and duty cycle adjustment of the DC voltage at a first frequency to first selected electromagnetic coils of the plurality of electromagnetic coils when a drive component is approximately adjacent to the first selected electromagnetic coils; and
        independently control a transfer of power to the at least one power pick-up panel of each of the plurality of moving elements by pulse width modulation and duty cycle adjustment of the DC voltage at a second frequency to second selected electromagnetic coils of the plurality of electromagnetic coils when a power pick-up panel is approximately adjacent the second selected electromagnetic coils, in order to simultaneously drive the moving element and transfer power to at least one power pick-up panel of at least one moving element.

2. A system according to claim 1, wherein the control system is configured to independently switch power on or off to each of the plurality of moving elements.

3. A system according to claim 1 wherein the power pick-up panel comprises an inductive panel.

4. A system according to claim 1 wherein the first frequency is higher than the second frequency.

5. A system according to claim 4 wherein the second frequency is in a range of approximately 0.5 to 10 kHz.

6. A system according to claim 1 wherein the at least one power pick-up panel is provided to the moving element in spaced relation with respect to a center point of the moving element and comprises one or more inductive coils selected based on the amount of power needed on the moving element.

7. A method for providing power to a plurality of moving elements in a transport system, the method comprising:
    tracking a position of each of the plurality of moving elements in the transport system; and
    selectively operating a power system, comprising a plurality of electromagnetic coils, provided to the transport system based on the position of a power pick-up panel provided to each moving element such that power is directly and independently transferred to each of the plurality of moving elements by adjusting a frequency of a pulse width modulated signal provided to selected electromagnetic coils of the plurality of electromagnetic coils that are approximately adjacent to the power pick-up panel from a higher frequency used to drive the moving element to a lower frequency, to simultaneously transfer power for applications other than moving the moving element while also driving the moving element.

8. A method according to claim 7 wherein the lower frequency is in a range of approximately 0.5 to 10 kHz and is selected in order to generate a ripple current sufficient to transfer the power to the moving element.

9. A method for providing power to a plurality of moving elements in a transport system, the method comprising:
    adapting the plurality of moving elements to receive power from a drive component used to drive the plurality of moving elements along the transport system for applications other than driving the moving element, wherein the drive component comprises a plurality of electromagnetic coils that selectively receive a pulse width modulated DC voltage at a first frequency and predetermined duty cycle to drive the plurality of moving elements; and
    controlling the drive component to simultaneously drive and transfer power to at least a selected one of the plurality of moving elements by selectively providing a pulse width modulated DC voltage at a second frequency that is different from the first frequency to electromagnetic coils approximately adjacent to the selected moving element.

10. A method according to claim 9 wherein the second frequency is lower than the first frequency.

11. A method according to claim 10 wherein the second frequency is in a range of approximately 0.5 to 10 kHz and is selected in order to generate a ripple current sufficient to transfer the power to the moving element.

\* \* \* \* \*